April 25, 1933. H. GLAENZER 1,905,636
FOUR-WHEEL TRAILER TRUCK AND ASH HOPPER
Filed Nov. 27, 1931  3 Sheets-Sheet 1
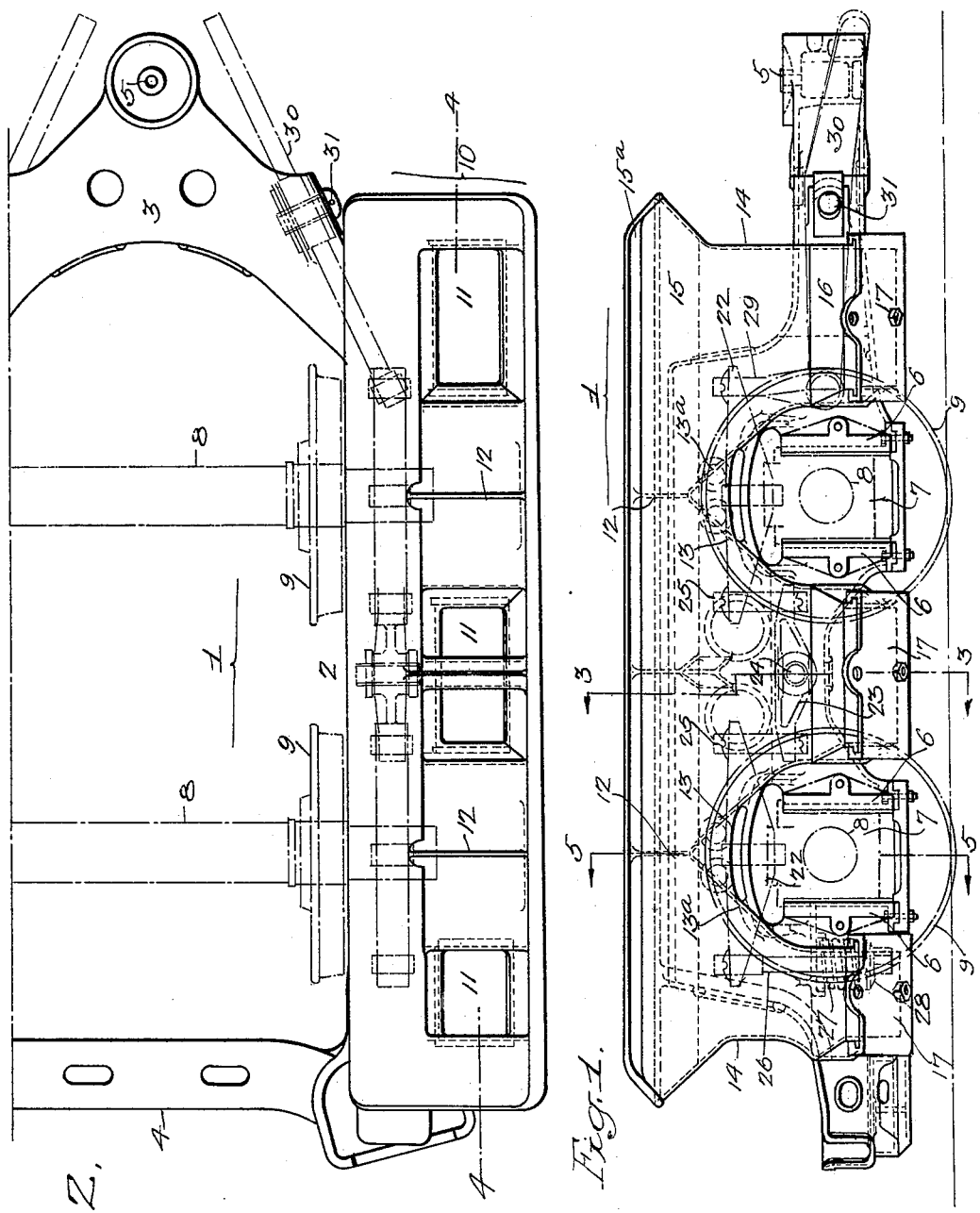

April 25, 1933. H. GLAENZER 1,905,636
FOUR-WHEEL TRAILER TRUCK AND ASH HOPPER
Filed Nov. 27, 1931  3 Sheets-Sheet 2
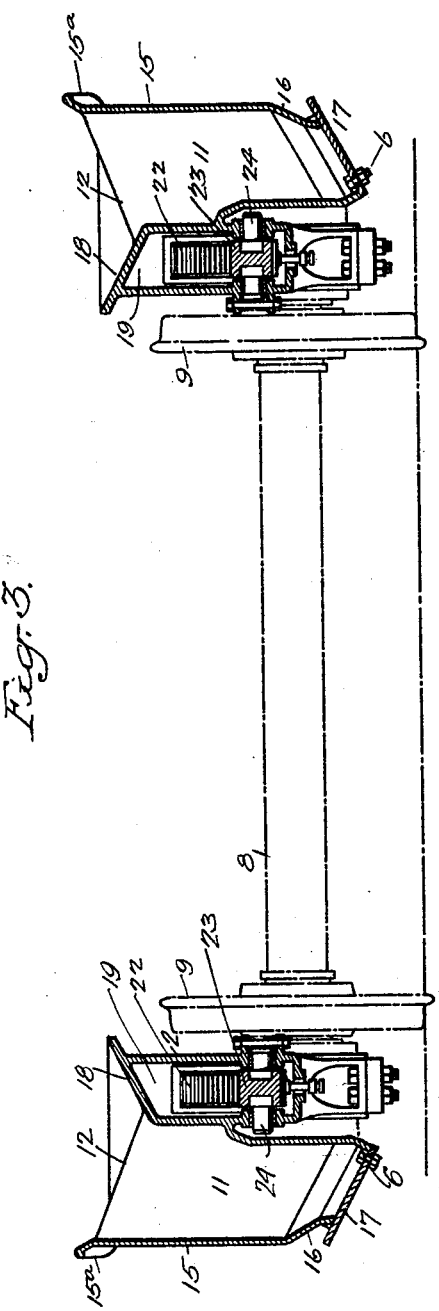
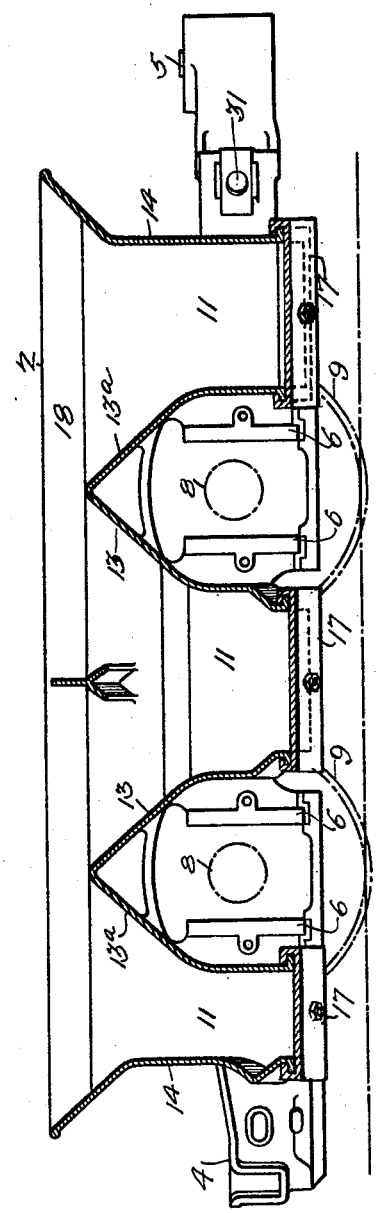
Inventor:
Harry Glaenzer
by his Attorneys
Howson & Howson

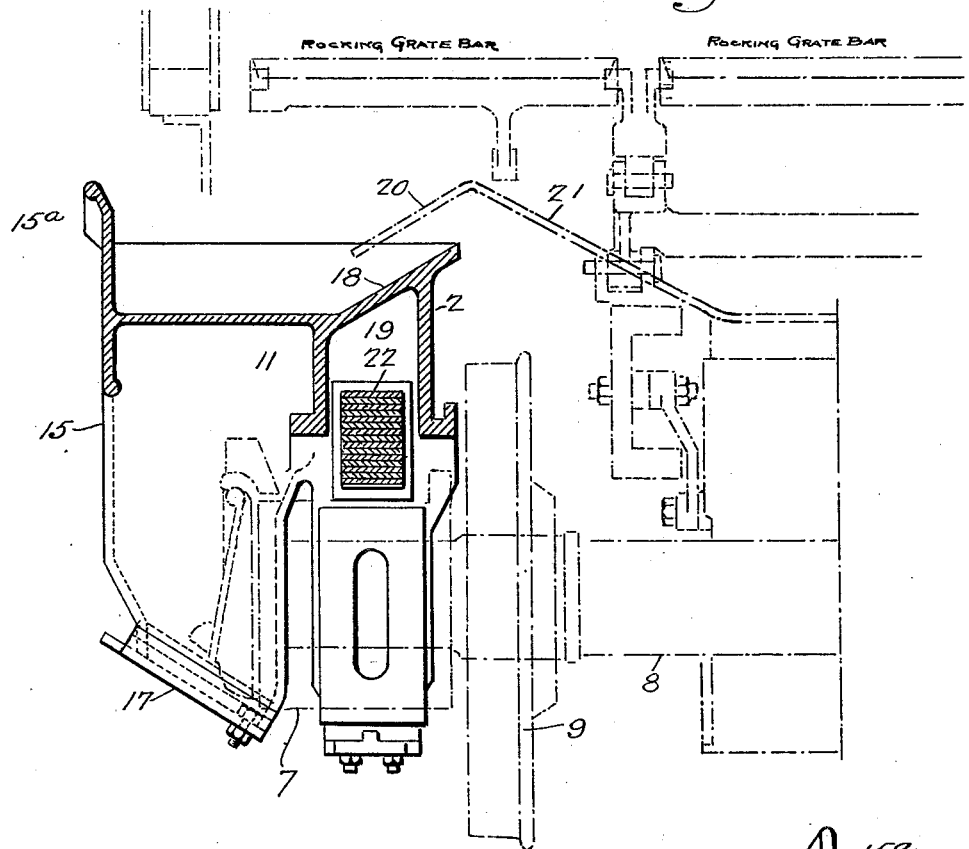
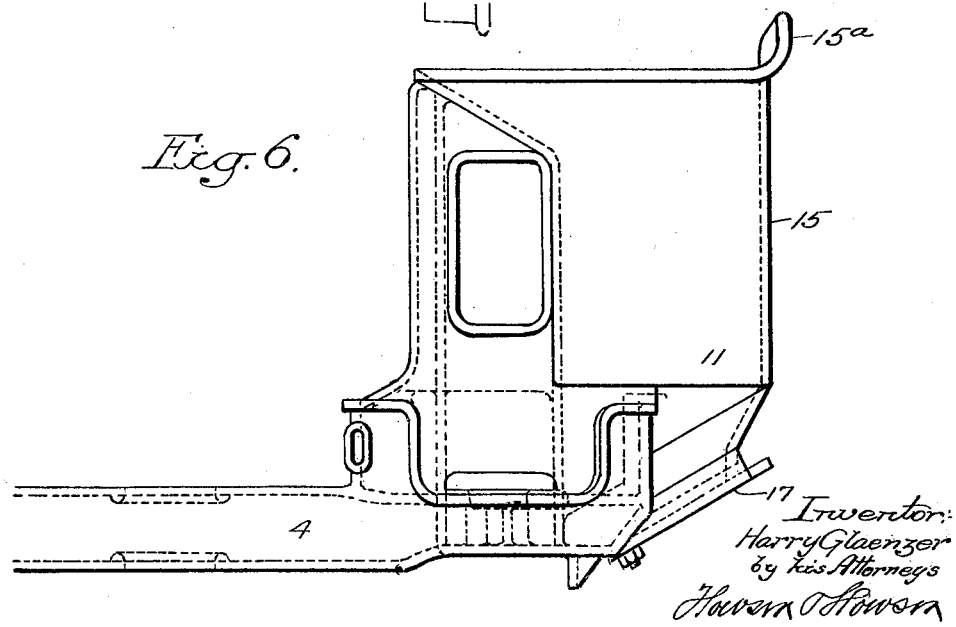

Patented Apr. 25, 1933

1,905,636

UNITED STATES PATENT OFFICE

HARRY GLAENZER, OF PHILADELPHIA, PENNSYLVANIA

FOUR-WHEEL TRAILER TRUCK AND ASH HOPPER

Application filed November 27, 1931. Serial No. 577,622.

One object of my invention is to provide a trailer truck for locomotives with ash hoppers which receive ashes from the ash pans of a locomotive and deliver the ashes at the side of the track.

A further object of the invention is to make the ash hoppers of the trucks an integral part of the frame of the truck.

My invention is particularly adapted to 4-wheel trailer trucks, but the number of wheels will depend considerably upon the type of locomotive to which the trailer truck is adapted.

In the accompanying drawings:

Fig. 1 is a side view of a 4-wheel trailer truck, showing the ash hoppers made integral with the frame;

Fig. 2 is a plan view of one-half of the frame of the truck, the axles, wheels and equalizing mechanism being shown in dotted lines;

Fig. 3 is a transverse sectional view on the line 3—3, Fig. 1;

Fig. 4 is a longitudinal sectional view on the line 4—4, Fig. 2;

Fig. 5 is a transverse sectional view of one side of the truck, drawn to an enlarged scale on the line 5—5, Fig. 1; and Fig. 6 is a rear elevation on one side of the truck.

Referring to the drawings: 1 is the frame of the truck, consisting of side members 2 and end members 3 and 4, the end member 3 being extended to form a radius bar having a pivot opening 5 for the pivot on which the truck swings. The end member 4 is preferably made integral with the frame of the truck, but in some instances may be detachably secured to the side members, so that the frame can be removed if ready access is desired to the mechanism between the truck frames. The two side frames and the end frame 3, as well as the end frame 4 in the present instance, are made as an integral casting.

6 are the pedestals of the truck, which may be of any standard design, and in these pedestals are the boxes 7 for the axles 8, on which are mounted the wheels 9.

10 is a laterally projecting hopper member, formed in the present instance integral with the main frame 1 and having hoppers 11 therein, which straddle the axle boxes. There are three sets of hoppers in the present instance, divided by vertical partitions 12, and the central hopper has inclined walls 13 on the opposite sides, and the end hoppers have inclined walls 13a at the side of the axle boxes, the end walls 14 of the end hoppers being preferably shaped as shown in Fig. 1.

The outer walls 15 of the hopper are vertical to a considerable depth and are inwardly inclined at 16, so as to reduce the area of the mouth of the hopper.

The mouth of each hopper is preferably beveled, as shown in Figs. 3 and 4, so that the ashes discharged from the hoppers will be discharged away from the rails at each side of the truck, and the lower ends of the hoppers in the present instance are provided with outside guides for sliding gates 17.

The inner upper edges 18 of the hoppers are inclined over the space 19, in which are located the levers and springs of the equalizing gear as shown in Fig. 5, and in fact this portion 18 forms the top of the side members 2 of the truck.

The inclined upper edges 18 of the hoppers underlap the inclined side plates 20 of the main ash pan 21, shown by dotted lines in Fig. 5. These inclined plates 20 in the present instance are directly under the inner portion of the side rocking grates of the fire box of the locomotive. The outer portions of the grates discharge directly into the hoppers of the truck as shown in Fig. 5.

The grates of the locomotive are comparatively wide and the ash pan has a main central portion which discharges ashes between the rails of the track while the outer sections discharge the ashes into the hoppers 11 at each side of the truck, and these hoppers, when the gates are opened, discharge ashes beyond the rails of the track.

The particular construction of the ash pan, which is attached to the locomotive fire box, is set forth and claimed in a companion application, Serial No. 581,029, filed on the fourteenth day of December, 1931.

This invention particularly relates to the trucks with the ash hoppers forming an integral part of the frame or mounted on the frame.

The outer walls 15 are preferably extended above the discharge point of the inclined plates 20, as shown at 15a, so as to prevent ashes as they are discharged into the hoppers, from escaping over the tops of the hoppers. The sliding gates 17 are normally closed to allow the ashes to accumulate until a certain discharge point is reached, when the gates can be opened, and in some instances the gates may be provided at the ash pan so that the ashes may be discharged into the hoppers from the pan at intervals.

At each side of the truck, within the main side frames, are the equalizing mechanisms of the truck. At each side of the truck are semi-elliptical springs 22, which rest upon the boxes 7, and 23 is the equalizing lever, pivoted at 24 to the frame of the truck. The ends of this lever are connected by links 25 to the inner ends of the springs 22. The outer end of the rear spring 22 is connected to the frame by a link 26, through the medium of a coil spring 27, the upper end of which rests upon a spring seat on the frame, and the lower end rests upon a seat spring 28 on the link 26.

The forward end of the front spring 22 at each side of the truck is connected by a link 29 to an equalizing beam 30, which is mounted on a pivot pin 31 having its bearings in the radius bar 3 of the truck. The outer ends of this equalizing beam are connected in the ordinary manner to the main equalizing mechanism of the locomotive.

It will be noticed that by making partitions in the ash hoppers at each side of the frame of the truck, and inclined in the lower portions as shown, the said hoppers straddle the openings for the journal boxes, so that the axle boxes can be installed, inspected and repaired without dismantling any portion of the truck.

By the above construction it will be seen that the truck is provided with ash hoppers which are preferably formed integral with the main frame of the truck, and these hoppers are preferably designed so as to receive ashes from the side members of the main ash pan and from the outer portions of the grates of the locomotive, so that the ashes discharged from the side grates of the locomotive will be discharged through the hoppers to each side of the track.

It will be noticed in referring to Fig. 5 that sufficient clearance is provided between the main ash pan of the locomotive and the hopper structure of the truck, so as to allow free swinging motion of the truck beneath the overhanging portion of the ash pan.

I claim:

1. The combination in a radial truck for a locomotive, of a frame having pedestals for axle boxes and equalizing gear located in the frame at each side thereof, said gear resting upon the boxes between the pedestals; and ash hoppers on the outer side of the frame beyond the equalizing gear, arranged to receive ashes from the grates and main ash pan of the locomotive.

2. The combination in a four-wheel radial swing truck having two sets of pedestals on each side for axle boxes, of a central ash hopper and end ash hoppers beyond the main side frames of the truck, the ash hoppers being separated by partitions spanning the openings for the axle boxes.

3. The combination in a four-wheel radial swing truck, of a frame having pedestals for axle boxes and having a space for equalizing mechanism, the ash hoppers made integral with the frame and projecting at each side thereof, said hoppers straddling the space in which the axle boxes are mounted, the hoppers having inclined inner walls underlapping the side plates of the ash pan of the locomotive.

4. The combination in a four-wheel radial swing truck, of a frame having pedestals for axle boxes and having a space for equalizing mechanism, the ash hoppers made integral with the frame and projecting at each side thereof, said hoppers straddling the space in which the axle boxes are mounted, the hoppers having inclined inner walls underlapping the side plates of the ash pan of the locomotive; and having upwardly projecting outer walls extending above the line of the inner wall so as to prevent ashes escaping over the top of the outer wall as they are discharged from the ash pan and grates.

5. The combination in a locomotive truck, of a truck frame having an ash hopper at each side thereof; a grate of a fire box, the outer portions of the grate being above the hoppers; and an ash pan having side members extending under the grates for directing ashes, so that portions of the ashes from the grate will drop onto the extension of the pan and into the hoppers, while the ashes passing through the outer portions of the grate will drop directly into the hoppers.

HARRY GLAENZER.